United States Patent [19]

Randour

[11] 3,953,085

[45] Apr. 27, 1976

[54] TUBULAR GUARD FOR TRACK ROLLER FRAMES AND METHOD FOR MAKING THE SAME

[75] Inventor: Victor Randour, Aurora, Ill.

[73] Assignee: Caterpillar Tractor Co., Peoria, Ill.

[22] Filed: Mar. 17, 1975

[21] Appl. No.: 558,978

[52] U.S. Cl. ................................. 305/16; 305/60
[51] Int. Cl.² .................................... B62D 55/10
[58] Field of Search ............... 305/6, 10, 11, 12, 13, 305/16, 17, 18, 60; 180/5 R

[56] References Cited
UNITED STATES PATENTS

| | | | |
|---|---|---|---|
| 3,332,725 | 7/1967 | Reinsma | 305/10 |
| 3,662,847 | 5/1972 | Skanes | 305/60 |
| 3,695,736 | 10/1972 | Brown | 305/18 |

Primary Examiner—Philip Goodman
Assistant Examiner—John A. Carroll
Attorney, Agent, or Firm—Phillips, Moore, Weissenberger Lempio & Strabala

[57] ABSTRACT

A track-type vehicle comprises a pair of track roller frames pivotally mounted on either side thereof. Each of the frames comprises a tubular guard including a pair of longitudinally disposed members secured together by a pair of upper and lower welds extending substantially the full length of the frame and disposed medianly thereon. Each of the members is initially formed with an upwardly projecting flat portion which is thereafter bent inwardly to have its end secured to an adjacent end of the other member by the upper weld.

14 Claims, 3 Drawing Figures

TUBULAR GUARD FOR TRACK ROLLER FRAMES AND METHOD FOR MAKING THE SAME

BACKGROUND OF THE INVENTION

Track roller frames for track-type vehicles, such as crawler tractors, comprise a pair of track roller frames pivotally mounted on either side thereof. Such frames must constitute a rugged construction exhibiting a high degree of structural integrity since they are adapted to support the vehicle on a plurality of track rollers rotatably mounted thereon. The track roller frame further mounts an idler on a forward end thereof and a recoil mechanism and attendant mechanisms thereon. Typical track roller frames of this type are disclosed in U.S. Pat. No. 3,336,087 and U.S. Patent application Ser. No. 428,092, filed on Dec. 26, 1973, by Gary D. Blomstrom et al. for "Combined Integral Component Enclosure and Track Roller Frame", both assigned to the assignee of this application.

SUMMARY OF THIS INVENTION

An object of this invention is to provide an improved and non-complex track roller frame which exhibits a high degree of structural integrity when placed in operation. Another object of this invention is to provide an economical method for making a tubular guard of the track roller frame expeditiously and from a pair of substantially identical members.

The tubular guard, adapted to rotatably mount a plurality of track rollers thereon, comprises a pair of longitudinally disposed members secured together at upper and lower edges thereof disposed medianly of the guard and extending substantially the full length thereof. The method is accomplished by initially forming each of the members with a generally upright first wall portion and a second wall portion extending inwardly from the first wall portion and by thereafter bending and securing the respective first and second wall portions together, preferably by a pair of longitudinally extending upper and lower welds.

BRIEF DESCRIPTION OF THE DRAWINGS

Other objects of this invention will become apparent from the following description and accompanying drawings wherein.

DETAILED DESCRIPTION

Figure 1:
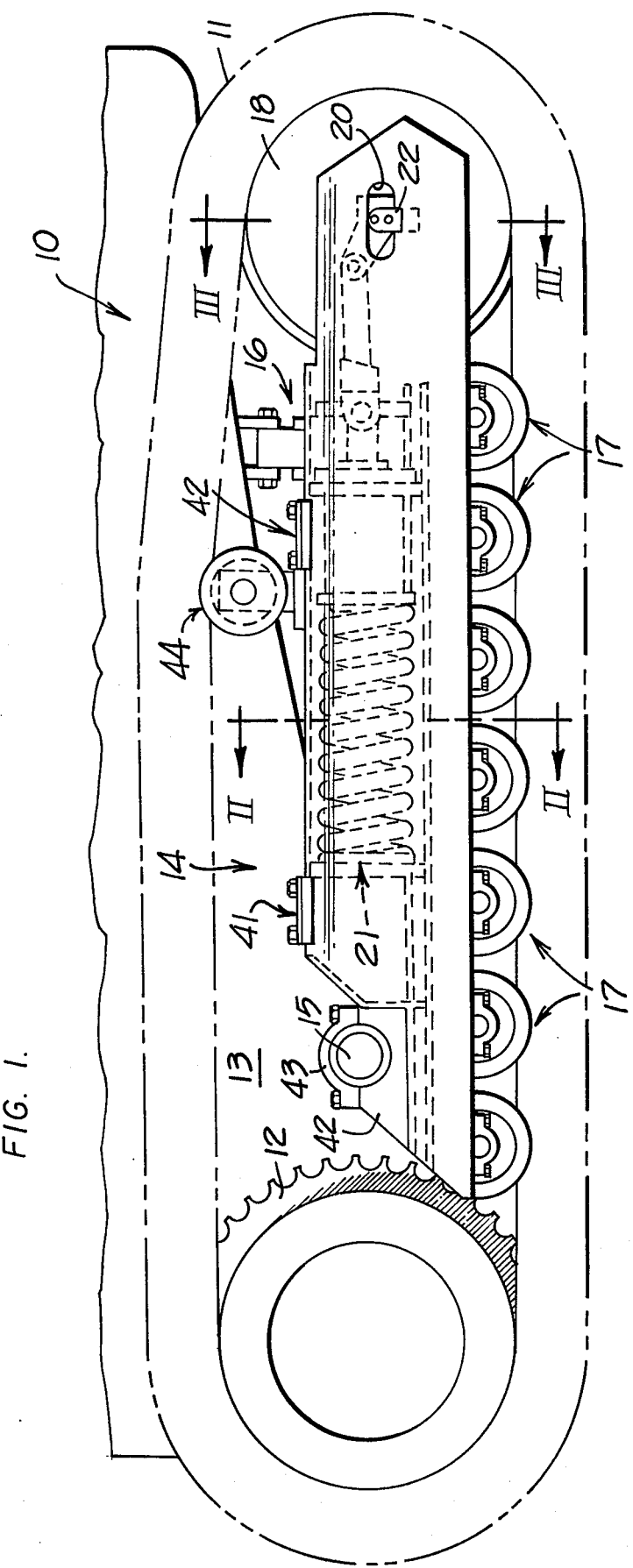
FIG. 1 is a side elevational view of the undercarriage of a track-type vehicle having the improved track roller frame of this invention incorporated therein.

FIG. 1 illustrates an endless track assembly 10 for a track-type vehicle which is substantially disclosed in above-references U.S. Patent application Ser. No. 428,092. In particular, the endless track assembly comprises an endless track 11 adapted to be driven by a drive sprocket 12 rotatably mounted on a main frame 13 of the vehicle. A rearward end of the track roller frame 14 is pivotally mounted on the main frame by a pivot shaft 15 whereas a forward end of the track roller frame is supported on the main frame by an equalizer bar mounting 16.

Figure 3:
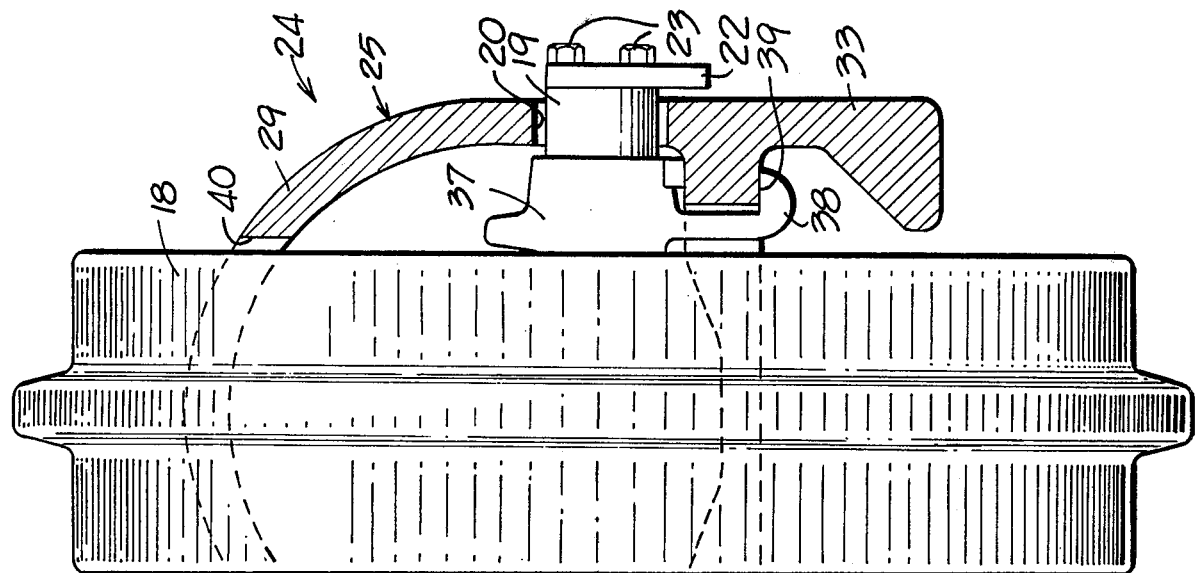
FIGS. 2 and 3 are sectional views taken in the direction of arrows II—II and III—III in FIG. 2, respectively, but with portions of attendant mechanisms supported on the track roller frame deleted for clarity purposes.

A plurality of track rollers 17 are rotatably mounted on the track roller frame which further rotatably mounts an idler 18 on a forward end thereof. The idler is rotatably mounted on a shaft 19 having each of its lateral ends disposed in an elongated lost motion slot 20 and suitably connected to a recoil mechanism 21. As shown in FIGS. 1 and 3, a bracket 22 is releasably attached to each end of shaft 19 by cap screws 23 to position the idler laterally relative to frame 14.

Figure 2:
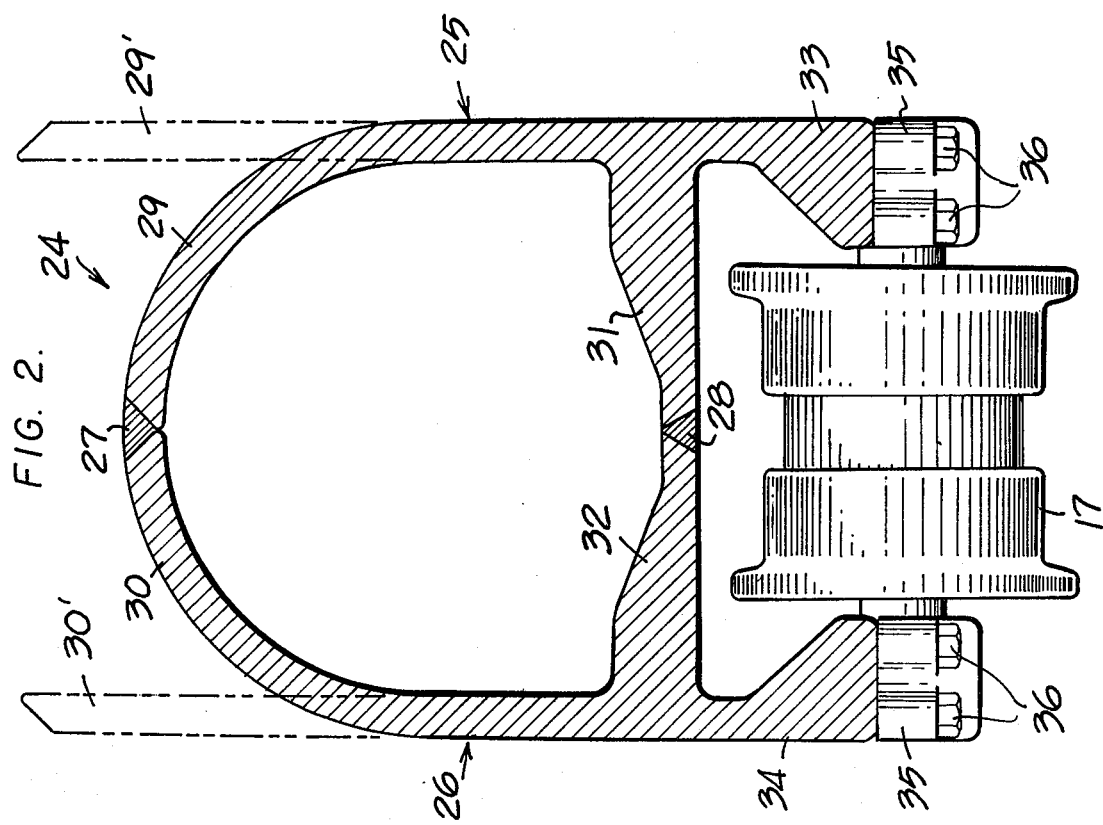

The track roller frame comprises a tubular guard 24 substantially constituting a pair of longitudinally disposed and substantially identical members 25 and 26 secured together by upper and lower welds 27 and 28, respectively (FIG. 2). The members comprise laterally positioned first wall portions 29 and 30 having their free upper edges secured together at common weld 27 and a pair of second or bottom wall portions 31 and 32 having their free lower edges secured together at common weld 28. The welds are disposed medianly of guard 24 and extend substantially the full length thereof to provide substantially all of the securance therebetween.

As further shown in FIG. 2, members 25 and 26 have a pair of longitudinally extending support portions 33 and 34 integrally formed thereon, respectively. The elongated support portions extend downwardly on the outboard sides of the guard below wall portions 31 and 32 and coextensively of the guard. The end of the shaft of each track roller assembly 17 is suitably attached to an underside of a respective support portion by a bracket 35 and cap screws 36. Referring to FIG. 3, a bracket 37 is secured on each end of idler shaft 19 and has a hook portion 38 which engages beneath a bearing surface 39, formed on each of the members 25 and 26 to aid in retaining the idler in position thereon.

The method for making guard 24 will now be described. Referring to FIG. 2, member 25, for example, is suitably roll-formed or the like to comprise a generally upright and flat first wall portion 29', second wall portion 31 and downwardly projecting support portion 33 which is generally coplanar and coextensive with respect to the first wall portion. Member 26 is formed in a like manner.

First wall portion 29' is then suitably bent into its final arcuate configuration 29 and into overlying and vertically spaced relationship relative to first wall portion 31. The adjacent edges of wall portions 29 and 30 are then secured together by common weld 27 whereas second wall portions 31 and 32 are secured together at their edges by common weld 28. Either prior to such welding or subsequent thereto, the various cutouts and slots for accommodating actuating mechanisms of the endless track assembly may be formed in the guard.

For example, slots 20 are suitably formed through the sidewalls of the guard to accommodate the ends of shaft 19 whereas a suitably formed slot 40 is formed medianly and longitudinally at a forward end and towards an aft end of the guard to accommodate reciprocal idler 18 therein. Access openings (not shown) may be suitably formed through the top wall of the guard and covered by releasable covers 41 to facilitate servicing of recoil mechanism 21. A pillow block 42 is suitably secured on an aft end of the guard to attach the track roller frame to pivot shaft 15 by means of a cap 43. The remaining mechanisms, including equalizer bar mounting 16, track roller assemblies 17 and a carrier roller assembly 44, are then suitably secured in place.

I claim:

1. In a track-type vehicle of the type comprising a pair of metallic track roller frames mounted on either side thereof and a plurality of track rollers rotatably mounted on each of said frames, the improvement wherein each of said frames comprises a tubular guard including a pair of longitudinally disposed substantially identical members secured together at pairs of upper and lower edges thereof disposed medianly of said guard and extending substantially the full length thereof.

2. The vehicle of claim 1 wherein said members each comprises an arcuate first wall portion and a second wall portion extending inwardly from said first wall portion in underlying and vertically spaced relationship therewith.

3. The vehicle of claim 2 wherein said first wall portions are secured together at adjacent edges thereof by a common weld.

4. The vehicle of claim 3 wherein said seond wall portions are secured together at adjacent edges thereof at a common weld.

5. The vehicle of claim 1 wherein each of said members comprises a support portion extending downwardly from said first wall portion and below said second wall portion and further comprising a track roller assembly releasably attached to said support portions.

6. The vehicle of claim 1 further comprising means forming a slot at a forward end of said members and further comprising an idler rotatably mounted on a forward end of said guard and at least partially disposed in said slot.

7. The vehicle of claim 6 wherein said idler assembly comprises a bracket secured on each end of a shaft thereof, said bracket comprising a hook portion engaging a bearing surface formed on a respective one of said members.

8. The vehicle of claim 7 wherein each end of a shaft carrying said idler thereon is disposed in an elongated slot formed through a sidewall of said guard and further comprising a recoil mechanism disposed in said guard and operatively connected to the shaft of said idler.

9. A method for making a tubular guard for a track roller frame of a track-type vehicle comprising the steps of forming a pair of substantially identical metallic members to each comprise a generally upright first wall portion and a second wall portion extending inwardly from said first wall portion bending the first wall portion of each of said members into overlying relationship relative to a respective second wall portion first securing said first wall portions together longitudinally and medianly thereof, and second securing said second wall portions together longitudinally and medianly thereof.

10. The method of claim 9 wherein said bending step comprises bending each of said first wall portions into an arcuate configuration.

11. The method of claim 9 wherein said first securing step comprises securing adjacent edges of said first wall portions together by a common weld.

12. The method of claim 11 wherein said second securing step comprises securing adjacent edges of said second wall portions together by a common weld.

13. The method of claim 9 further comprising the step of forming an elongated support portion coextensively relative to each of said first wall portions and vertically below a respective second wall portion and attaching a track roller assembly laterally between the support portions of said members.

14. The method of claim 13 further comprising the step of forming slots in said first wall portions and said second wall portions so that said slots extend medianly and longitudinally towards an aft end of said guard and rotatably mounting an idler on a forward end of said guard and at least partially within said slot.

* * * * *